US008621624B2

(12) United States Patent
Jang et al.

(10) Patent No.: US 8,621,624 B2
(45) Date of Patent: Dec. 31, 2013

(54) APPARATUS AND METHOD FOR PREVENTING ANOMALY OF APPLICATION PROGRAM

(75) Inventors: In Sook Jang, Daejeon (KR); Eun Young Lee, Daejeon (KR); Hyung Geun Oh, Daejeon (KR); Do Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 607 days.

(21) Appl. No.: 12/332,012

(22) Filed: Dec. 10, 2008

(65) Prior Publication Data

US 2009/0313699 A1    Dec. 17, 2009

(30) Foreign Application Priority Data

Jun. 17, 2008    (KR) ........................ 10-2008-0056736

(51) Int. Cl.
*G06F 21/00*    (2013.01)
(52) U.S. Cl.
USPC ............. 726/23; 713/189; 713/190; 713/191; 713/192; 713/193; 713/194
(58) Field of Classification Search
USPC ................................................ 713/189–194
See application file for complete search history.

(56) References Cited

U.S. PATENT DOCUMENTS

| 6,405,318 B1 * | 6/2002 | Rowland ........................ 726/22 |
| 7,448,084 B1 * | 11/2008 | Apap et al. ....................... 726/24 |
| 7,653,665 B1 * | 1/2010 | Stefani et al. ................... 714/19 |
| 2007/0121596 A1 * | 5/2007 | Kurapati et al. .............. 370/356 |
| 2008/0066179 A1 | 3/2008 | Liu |
| 2011/0093951 A1 * | 4/2011 | Aziz ............................... 726/24 |

FOREIGN PATENT DOCUMENTS

KR    1020060059759 A    6/2006

OTHER PUBLICATIONS

Chaekeum Park, et al; "Design of Intrusion Detection System by GET and POST information for Web Application Security", Proceedings of the 32$^{nd}$ KIISE Fall Conference (I) vol. 32, No. 2, pp. 142-144, Nov. 2005 (exact date not available).
Stephanie Forrest et al; "A Sense of Self for Unix Processes" In Proceedings of the 1996 IEEE Symposium on Security and Privacy, IEEE Computer Society Press, Los Alamitos, CA, pp. 120-128 (1996).

* cited by examiner

*Primary Examiner* — Ghazal Shehni
(74) *Attorney, Agent, or Firm* — Ladas & Parry LLP

(57) ABSTRACT

An apparatus and method for preventing an anomaly of an application program are provided. More particularly, an apparatus and method for preventing an anomaly of an application program that detect and stop an anomaly on the basis of a behavior profile for an application program are provided. The apparatus includes a behavior monitor that detects behavior of an application program in operation, an anomaly detector that determines whether the detected behavior of the application program is an anomaly on the basis of a behavior profile of the application program in operation, and an anomaly stopper that stops the behavior of the application program determined as an anomaly by the anomaly detector. Possible application program behavior is stored according to its purpose in a behavior profile and an anomaly is detected and stopped on the basis of the behavior profile, thereby decreasing a false-positive rate of anomaly detection and simultaneously solving a problem of a conventional security programs being incapable of defending against attacks using the authority of a program trusted by a user.

14 Claims, 5 Drawing Sheets

FIG. 4

```
<?xml version="1.0" encodeing="utf-8"?>
<Application_Behavior>
        < ApplicationInfo Name=" " Version=" " ImagePath=" "/>
        <Behavior>
                <ProcessCreation type="Selective">
                        <Process name=" " path=" "/>
                </ProcessCreation>
                <RegistryWrite type="Selective">
                        <Key Name=" " KeyPath=" " />
                </RegistryWrite>
                <FileWrite type="Always_Accept"/>
                <NetworkConnect type="Always_Reject ">
        </Behavior>
</Application_Behavior>
```

APPARATUS AND METHOD FOR PREVENTING ANOMALY OF APPLICATION PROGRAM

CROSS-REFERENCE TO RELATED APPLICATION

This application claims priority to and the benefit of Korean Patent Application No. 2008-56736, filed on Jun. 17, 2008, the disclosure of which is incorporated herein by reference in its entirety.

BACKGROUND

1. Field of the Invention

The present invention relates to an apparatus and method for preventing an anomaly of an application program, and more particularly, to an apparatus and method for preventing an anomaly of an application program that detect and stop the anomaly on the basis of a behavior profile for an application program.

2. Discussion of Related Art

In recent years computer hackers have been exploiting vulnerabilities in application programs such as word processors, media players, etc. to obtain people's Internet banking information, security document information, etc. Such attacks usually exploit application program vulnerabilities to install and execute a malicious program such as a virus, spyware, trapdoor, backdoor, or the like with the authority of a normal application program process.

Anti-virus programs widely used in personal computers (PCs) employ a method of collecting and analyzing known malicious files and pattern matching an extracted signature with a file to be checked. Accordingly, anti-virus programs provide no protection against day-zero attacks using unknown malicious codes.

FIG. 1 is a block diagram showing an execution environment of a conventional signature-based anti-virus program.

Referring to FIG. 1, a conventional anti-virus program 110 detects a malicious code 130 on the basis of a malicious code pattern stored in a signature database 120, which is periodically updated by an update engine 140. However, since new malicious codes whose patterns have not been added to the signature database 120 by the update engine 140 are not detected, the anti-virus program 110 provides no protection against attacks using them, like a day-zero attack.

On the other hand, an anomaly detection-based security program detects an attack using a malicious code by monitoring log files, user activities, and system calls. Unlike the signature-based anti-virus program, the anomaly detection-based security program may detect a new type of attack, but since it detects an anomaly by the same criteria regardless of the purpose of an application program, it has a high false-positive rate. To decrease the false-positive rate, the conventional anomaly detection-based security program enables an allowed application program to perform an operation of process generation or network connection according to set criteria.

FIG. 2 is a flowchart showing an anomaly detection process of a conventional anomaly detection-based security program.

Referring to FIG. 2, the conventional anomaly detection-based security program classifies application programs installed on a computer as normal or suspicious according to criteria set by a user (201). When an application program is classified as normal, all behavior of the application program is allowed (202). When an application program is classified as suspicious, its behavior is analyzed and compared with a pre-stored attack pattern (203 and 204). When the behavior of the application program is identified as an attack, the attack is stopped (205).

As descried above, the conventional anomaly detection-based security program allows all behavior of an application program trusted by a user without behavior analysis in order to decrease the false-positive rate when all application programs are compared with attack patterns by the same criteria. Therefore, there is a problem in that the conventional anomaly detection-based security program may not detect behavior of a reliable application program as an anomaly even when program vulnerabilities are exploited causing the application program to install or execute a malicious program.

SUMMARY OF THE INVENTION

The present invention provides an apparatus and method that can prevent an anomaly of an application program caused by a malicious attack using the authority of an application program trusted by a user.

According to an aspect of the present invention, there is provided an apparatus for preventing an anomaly of an application program, including: a behavior monitor that detects behavior of an application program in operation; an anomaly detector that determines whether the detected behavior of the application program is an anomaly on the basis of a behavior profile of the application program in operation; and an anomaly stopper that stops the behavior of the application program determined as an anomaly by the anomaly detector.

According to another aspect of the present invention, there is provided a method for preventing an anomaly of an application program, including: detecting behavior of an application program in operation; determining whether the detected behavior of the application program is an anomaly on the basis of a behavior profile of the application program in operation; and stopping the behavior of the application program determined as an anomaly.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 4 shows an example of an extensible markup language (XML) code of a behavior profile used in the apparatus for preventing an anomaly of an application program according to an exemplary embodiment of the present invention;

DETAILED DESCRIPTION OF EXEMPLARY EMBODIMENTS

Figure 1:
FIG. 1 is a block diagram showing an execution environment of a conventional signature-based anti-virus program.
Figure 2:
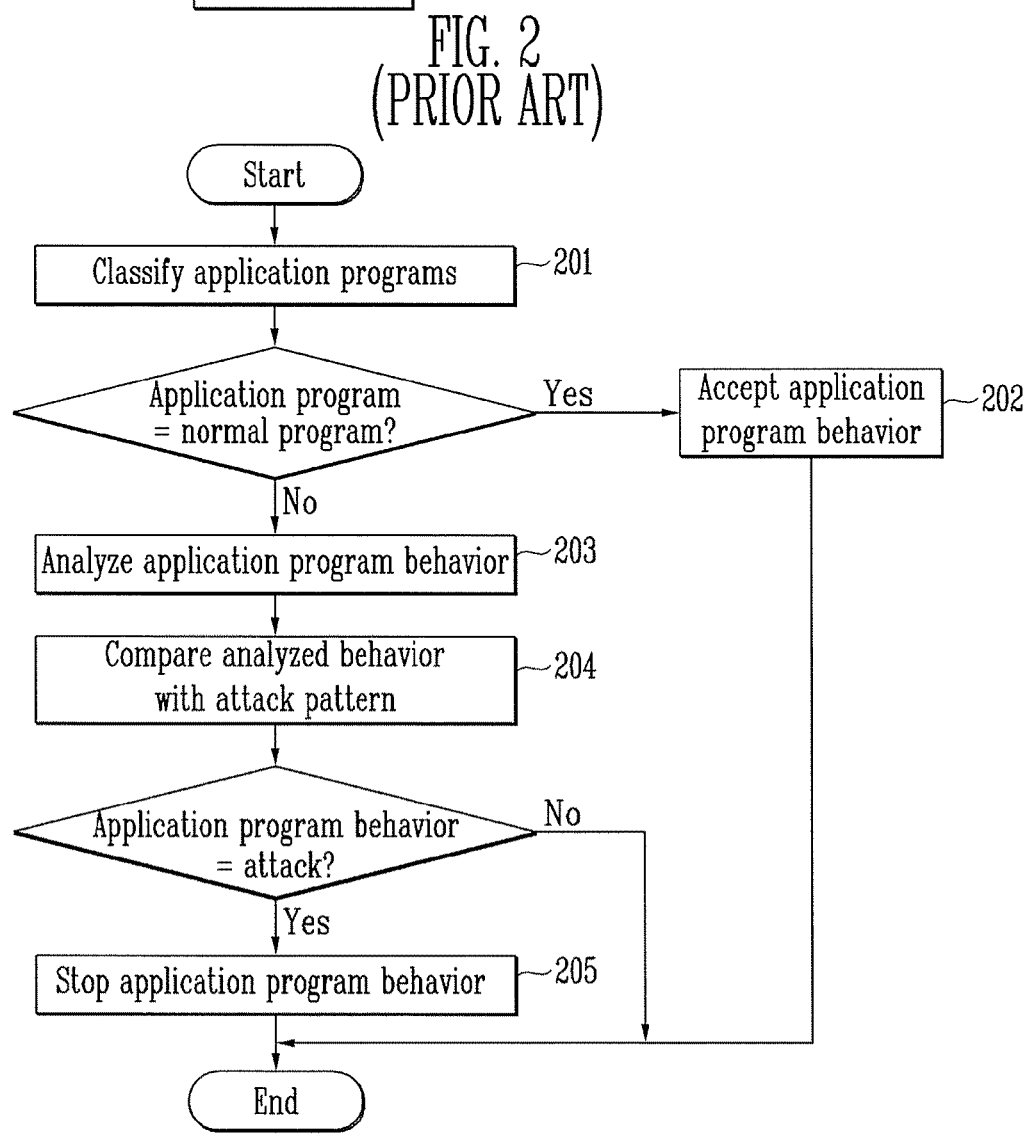
FIG. 2 is a flowchart showing an anomaly detection process of a conventional anomaly detection-based security program.
Figure 3:
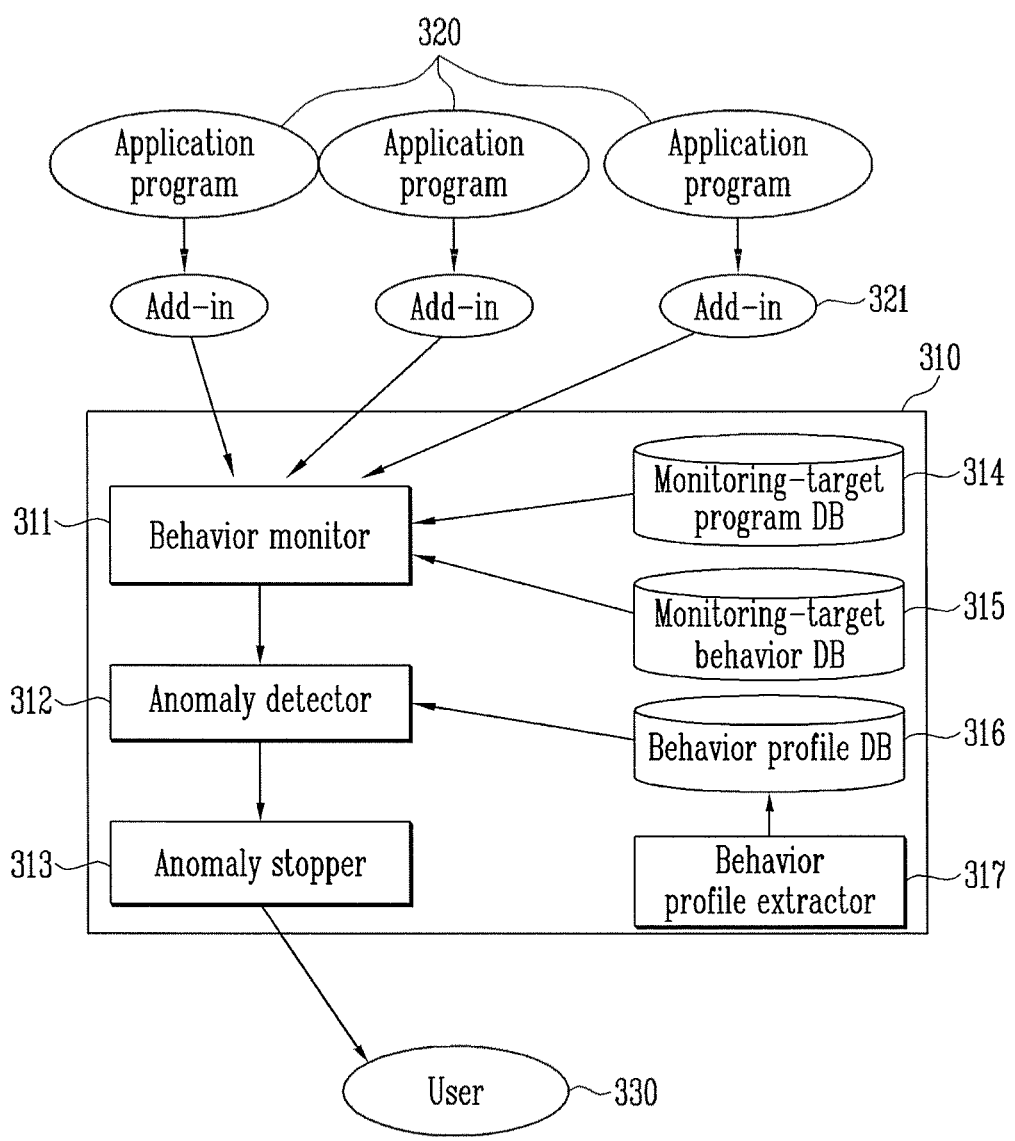
FIG. 3 is a block diagram showing a configuration of an apparatus for preventing an anomaly of an application program according to an exemplary embodiment of the present invention.

FIG. 3 is a block diagram showing a configuration of an apparatus for preventing an anomaly of an application program according to an exemplary embodiment of the present invention.

Referring to FIG. 3, an apparatus 310 for preventing an anomaly of an application program according to an exemplary embodiment of the present invention loads each application program 320 in a type of add-in 321 when the application program 320 starts and unloads the application program 320 when the application program 320 ends. The apparatus 310 includes a behavior monitor 311, an anomaly detector 312, an anomaly stopper 313, a monitoring-target program database (DB) 314, a monitoring-target behavior DB 315, and a behavior profile DB 316.

The behavior monitor 311 detects behavior of application programs 320 currently being executed and sends detection results to the anomaly detector 312. Here, the behavior monitor 311 can selectively detect behavior of monitoring-target application programs stored in the monitoring-target application program DB 314 among the behavior of application programs currently being executed. In an exemplary embodiment, the monitoring-target program DB 340 can store a list of monitoring-target application programs on the basis of user settings or application program manufacturer settings.

In this case, the behavior monitor 311 can detect behavior of the application programs on the basis of the monitoring-target behavior DB 315 which stores types of monitoring-target behavior capable of being classified as anomalies according to situations. For example, the monitoring-target behavior stored in the monitoring-target behavior DB 315 can include process generation, registry write, file generation, network connection, disk formatting, etc. In an exemplary embodiment, the behavior monitor 311 can analyze a type of behavior attempted by an application program by hooking and analyzing an application program interface (API) function called by each application program 320 using an API hooking module. The monitoring-target behavior DB 315 can store a list of API functions corresponding to monitoring-target behavior.

Here, API hooking is that of a process unit for hooking only events of a monitoring-target program without checking all system events. The API hooking is executed in the same address space as that of a monitoring-target application program by generating the apparatus 310 in an add-in type of the monitoring-target application program. The anomaly detector 312 determines whether behavior of the application program detected by the behavior monitor 311 on the basis of the behavior profile DB 316 is an anomaly.

Here, the behavior profile DB 316 stores a behavior profile of each application program installed in a computer. The behavior profile stores normal behavior of an application program while the application program is executed according to its purpose. For example, a file write behavior is needed while a specific document creation application program is executed, and is stored in the behavior profile of the document creation application program when a new process generation operation is not needed. Accordingly, when a new process is generated while the document creation application program is executed, behavior departing from the purpose of the application program based on the behavior profile of the document creation application program can be classified as an anomaly.

The behavior profile of the application program can be provided by an application program manufacturer. When the behavior profile is not provided by the application program manufacturer, it may be generated by an additional module. The apparatus for preventing an anomaly of an application program can further include a behavior profile extractor 317. The behavior profile extractor 317 can generate a behavior profile for recording behavior required to execute an application program by analyzing a source file of the application program or by simulating the application program for a given time and recoding behavior during execution of the application program. In an exemplary embodiment, the behavior profile can be created in an XML-based behavior description language for extension and standardization. An example of the XML-based behavior description language will be described in detail with reference to FIG. 4.

Unlike a conventional security program which does not restrict any behavior of a reliable application program, the anomaly detector 312 classifies as an anomaly departing from a purpose of an application program based on a behavior profile of the application program, thereby effectively detecting an anomaly of the application program by a malicious attack using the authority of a trusted application program.

When the anomaly detector 312 determines that behavior of an application program is an anomaly, the anomaly stopper 313 stops the behavior. The anomaly stopper 313 can output an alarm message indicating that the anomaly of the application program has been detected to a user 330 and record detection and stoppage results in a log. In an exemplary embodiment, the anomaly stopper 313 can stop the behavior of the application program without sending an API function hooked by the API hooking module to the application program.

FIG. 4 shows an example of an XML code of a behavior profile used in the apparatus for preventing an anomaly of an application program according to an exemplary embodiment of the present invention.

Referring to FIG. 4, the behavior profile can express information about normal behavior of an application program in operation according to a purpose of the application program, in an XML-based behavior description language. In this case, the application program behavior created in the behavior description language can include behavior that has an important effect on a system such as process generation, registry write, file generation, network connection, disk formatting, etc.

For example, in an XML code of a behavior profile, application program information (for example, a name, version, and representative image) is stored in <ApplicationInfo> tag, and allowance information of process generation, registry write, file write, and network connection behavior are stored in <ProcessCreation>, <RegistryWrite>, <FileWrite>, and <NetworkConnect> tags.

When a type of application program behavior is "Always Accept", the behavior is not identified as an anomaly since it conforms to a purpose of the application program. For example, when a type of <FileWrite> is indicated by "Always Accept", file write behavior of a corresponding application program is always recognized as rightful behavior.

When a type of application program behavior is "Selective_Accept" or "Selective_Reject", the behavior may be accepted depending on the situation. For example, when a type of <ProcessCreation> tag is "Selective_Accept", only process generation based on a name and path of a process stored in the <ProcessCreation> tag is accepted and all other behavior is classified as an anomaly. When a type of <ProcessCreation> is "Selective_Reject", only process generation based on a name and path of a process stored in the <ProcessCreation> tag is stopped and all other behavior is classified as normal.

When a type of application program behavior is "Always_Reject", the behavior does not conform to the purpose of the application program and is stopped as an anomaly. For example, when a type of <NetworkConnect>tag is "Always_Reject", a network connection behavior of the corresponding application program is detected and stopped as an anomaly.

As described above, the behavior profile can be provided by an application program manufacturer. Otherwise, the behavior profile extractor included in the apparatus for preventing an anomaly of an application program may extract the behavior profile from a source file of the application program or generate the behavior profile by recording behavior while the application program is executed by simulating the application program.

Figure 5:
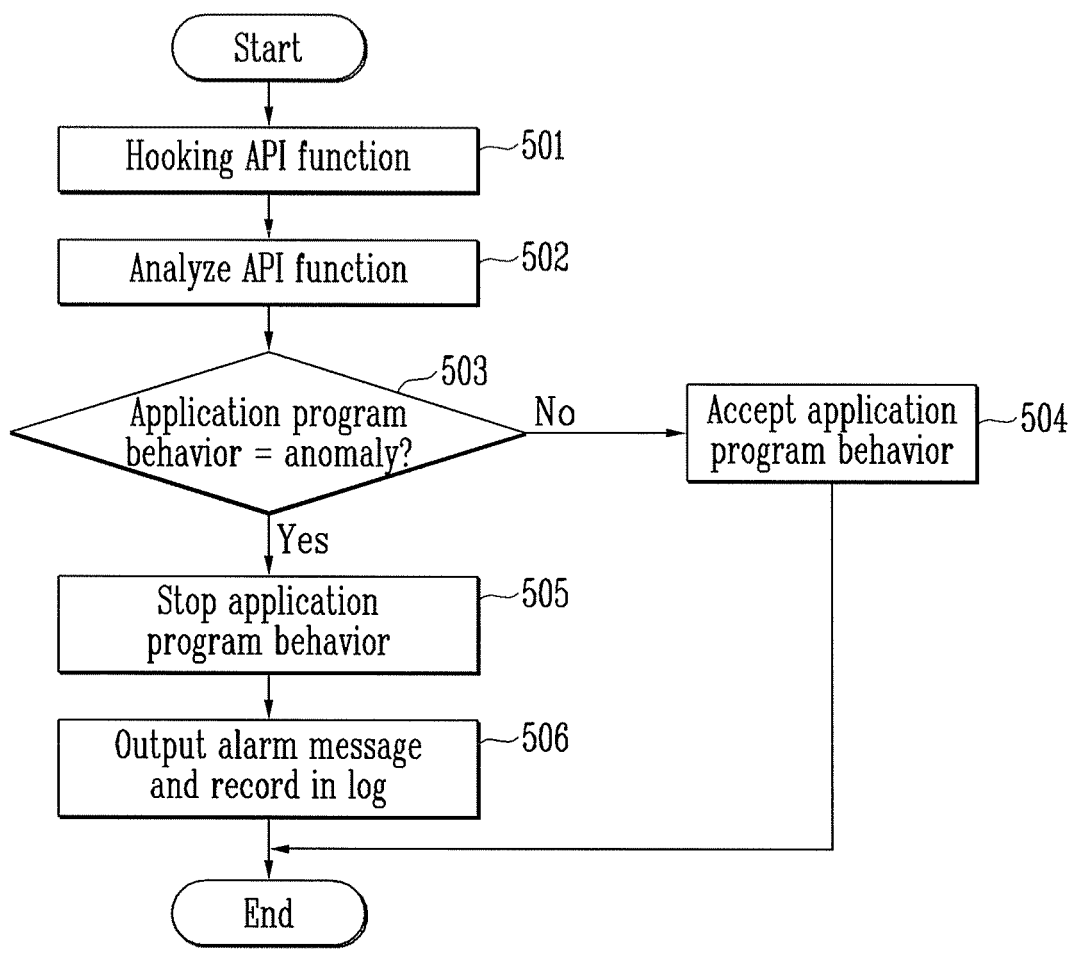
FIG. 5 is a flowchart showing a process of a method for preventing an anomaly of an application program according to an exemplary embodiment of the present invention.

FIG. 5 is a flowchart showing a process of a method for preventing an anomaly of an application program according to an exemplary embodiment of the present invention.

First, the behavior monitor hooks an API function called by an application program using an API hooking module (501). Here, the behavior monitor can selectively monitor only an application program included in monitoring targets among application programs in operation on the basis of the monitoring-target program DB.

Next, the behavior monitor analyzes the hooked API function and detects behavior attempted by the application program (502). In an exemplary embodiment, the behavior monitor can selectively detect only monitoring-target behavior capable of being classified as an anomaly on the basis of the monitoring-target behavior DB storing API functions corresponding to monitoring-target behavior.

The behavior monitor determines whether the behavior detected by the behavior monitor is an anomaly on the basis of a behavior profile of the corresponding application program (503). When there is no behavior profile of the corresponding application program, the behavior profile extractor can generate a behavior profile by analyzing a source code of the application program or by recording behavior in operation by simulating the application program.

Upon determining that the behavior of the application program is normal, the anomaly detector accepts the behavior of the application program (504). In an exemplary embodiment, the anomaly detector enables the application program to perform the behavior by sending the hooked API function to the application program.

Upon determining that the behavior of the application program is an anomaly, the anomaly stopper stops the behavior (505) and outputs an alarm message indicating that the anomaly of the application program has been detected to the user and records detection and stoppage results in a log (506).

Figure 6A:
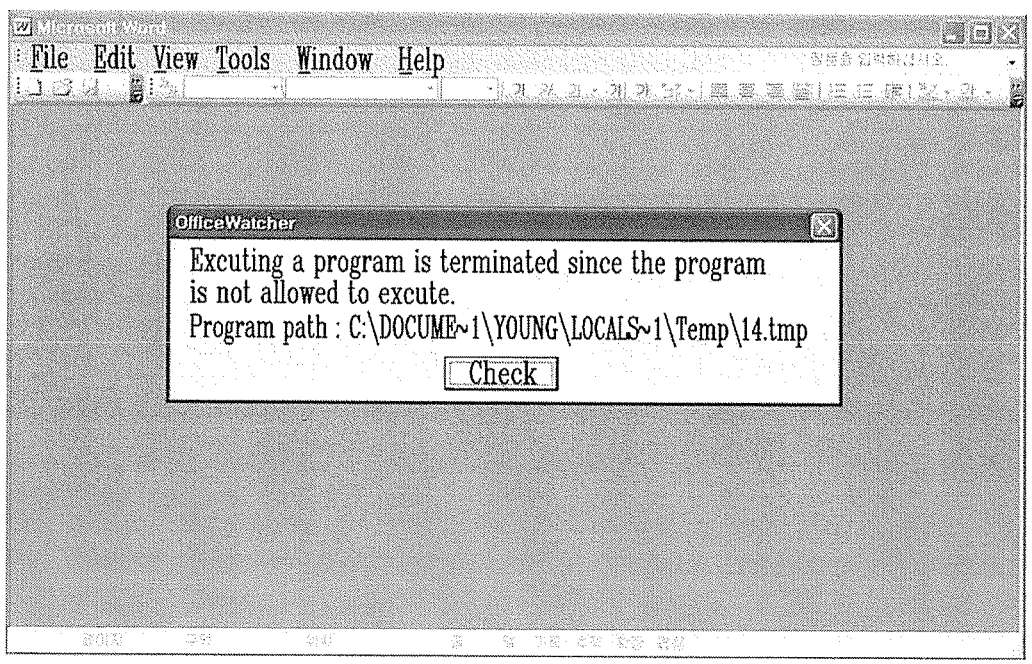
FIGS. 6A and 6B are examples of screens for detecting an anomaly of a Microsoft (MS) Office application program when a malicious file created using vulnerabilities in the MS Office application program is opened according to exemplary embodiments of the present invention.
Figure 6B:
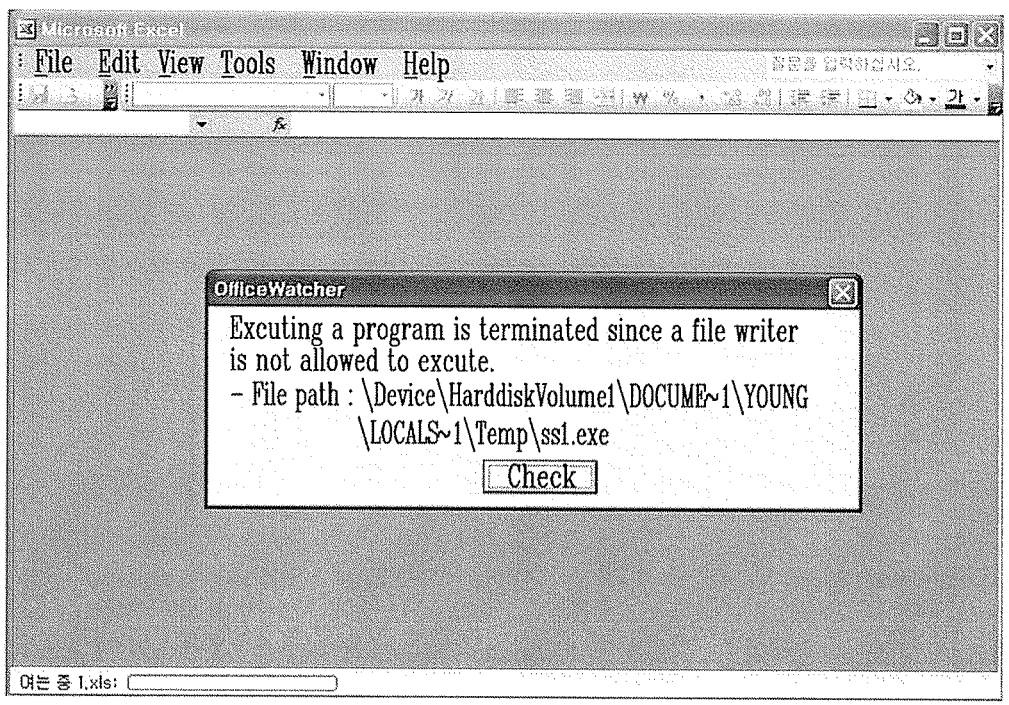

FIGS. 6A and 6B are examples of screens for detecting an anomaly of an MS Office application program when a malicious file created using vulnerabilities in the MS Office application program is opened according to exemplary embodiments of the present invention. FIG. 6A shows an example of a screen when abnormal file execution has been detected, and FIG. 6B shows an example of a screen when abnormal file write has been detected.

The present invention can store possible application program behavior according to its purpose in a behavior profile and detect and stop an anomaly on the basis of the behavior profile, thereby decreasing a false-positive rate of anomaly detection and simultaneously solving a problem of a conventional security program being incapable of defending against an attack using the authority of a program trusted by a user.

The present invention can save time and resources consumed in monitoring behavior of an application program, by selectively monitoring a specific behavior of a specific application program on the basis of a monitoring-target program database and a monitoring-target behavior database.

While the present invention has been shown and described in connection with exemplary embodiments thereof, it will be apparent to those skilled in the art that various modifications can be made without departing from the spirit and scope of the invention as defined by the appended claims.

What is claimed is:

1. An apparatus for preventing an anomaly of an application program executed in a computer, comprising:
 a hardware processor;
 a behavior profile database that stores a behavior profile for each application program installed in the computer, wherein the behavior profile comprises, for the each application program, information on behavior that is permitted to be executed by the respective application program in operation, and
 wherein the behavior comprises at least one of process generation, registry write, file write and network connection behavior;
 a behavior monitor that detects behavior of the application program in operation,
 wherein the behavior monitor detects only behavior of a selected application program based on a monitoring-target program database storing a predetermined list of monitoring-target application programs, and
 wherein the predetermined list is configured from a list of application program interface (API) functions;
 an anomaly detector that determines whether the detected behavior of the application program is an anomaly based on the behavior profile of the application program stored in the behavior profile database,
 wherein the anomaly is configured to be detected from at least a reliable application program,
 wherein the reliable application program is configured to be a program trusted by a user to be executed in the computer of the user, and
 wherein the anomaly is configured to determine that the detected behavior of the respective application program is different from the permitted behavior to be executed by the same respective application program; and
 an anomaly stopper that stops the behavior of the application program determined as the anomaly by the anomaly detector.

2. The apparatus of claim 1, further comprising:
 a behavior profile extractor that extracts the behavior profile of the application program in operation.

3. The apparatus of claim 2, wherein the behavior profile extractor extracts the behavior profile of the application program in operation by analyzing a source code of the application program in operation.

4. The apparatus of claim 2, wherein the behavior profile extractor extracts the behavior profile of the application program in operation by simulating the application program in operation.

5. The apparatus of claim 1, wherein the behavior profile is an extensible markup language (XML) code comprising a tag indicating whether each behavior is accepted.

6. The apparatus of claim 1, wherein the behavior monitor detects only monitoring-target behavior among behavior of the application program in operation on the basis of types of monitoring-target behavior stored in a monitoring-target behavior database.

7. The apparatus of claim 1, wherein the behavior monitor hooks and analyzes the respective (API) function called by the application program in operation using an API hooking module.

8. The apparatus of claim 7, wherein the behavior monitor detects only monitoring-target behavior among behavior of the application program in operation based on a monitoring-target behavior database storing the list of API functions corresponding to a monitoring-target behavior.

9. A method for preventing an anomaly of an application program executed in a computer, comprising:
storing a behavior profile for each application program installed in the computer, wherein the behavior profile comprises, for each application, information on behavior that is permitted to be executed by the application,
wherein the behavior comprises at least one of process generation, registry write, file write and network connection behavior;
detecting behavior of the application program in operation, and
wherein the detecting of the behavior of the application program in operation comprises:
detecting only behavior of a selected application program based on a monitoring-target program database storing a predetermined list of monitoring-target application program, and
wherein the predetermined list less than an actual list of behaviors that are performed for each of the application programs;
determining by a processor whether the detected behavior of the application program is an anomaly based on the stored behavior profile of the application program,
wherein the anomaly is detected from at least a reliable application program, and
wherein the reliable application program is a program trusted by a user to be executed in the computer of the user,
wherein the reliable application program is trusted by the user prior to the detecting of the behavior of the application program in operation, and
wherein the anomaly determines that the detected behavior of the selected application program from the respective application program is different from the permitted behavior to be executed by the same respective application program; and
stopping the behavior of the application program determined as the anomaly, and
wherein the behavior is stopped in the application program before being executed in the computer.

10. The method of claim 9, wherein in extracting the behavior profile of the application program in operation, the behavior profile is extracted by analyzing a source code of the application program in operation.

11. The method of claim 9, wherein in extracting the behavior profile of the application program in operation, the behavior profile is extracted by simulating the application program in operation.

12. The method of claim 9, wherein the detecting of the behavior of the application program in operation comprises:
hooking an API function called by the application program in operation; and
detecting the behavior attempted by the application program in operation by analyzing the hooked API function.

13. The method of claim 9, wherein the detecting of the behavior of the application program in operation comprises:
detecting only monitoring-target behavior among behavior of the application program in operation based on types of monitoring-target behavior stored in a monitoring-target behavior database.

14. An apparatus for preventing an anomaly of an application program executed in a computer, comprising:
a hardware processor;
a behavior profile database that stores a behavior profile for each application program installed in the computer, wherein the behavior profile comprises, for each application, information on behavior that is permitted to be executed by the application program,
wherein the behavior comprises at least one of process generation, registry write, file write and network connection behavior,
wherein the behavior is configured to be a normal behavior of an application program in operation, and
wherein the normal behavior comprises no malicious codes, and
wherein the malicious codes comprises known malicious codes or unknown malicious code;
a behavior monitor that detects behavior of the application program in operation,
wherein the behavior monitor detects only behavior of a selected application program based on a monitoring-target program database storing a list of monitoring-target application programs, and
wherein the behavior monitor hooks and analyzes an application program interface (API) function called by the application program in operation using an API hooking module;
an anomaly detector that determines whether the detected behavior of the application program is an anomaly based on the behavior profile of the application program stored in the behavior profile database,
wherein the anomaly is configured to be detected from at least a reliable application program,
wherein the reliable application program is configured to be a program trusted by a user to be executed in the computer of the user, and
wherein the anomaly is only determined from the detected behavior from a predetermined number of selected application programs for each of the application programs; and
an anomaly stopper that stops the behavior of the application program determined as the anomaly by the anomaly detector, and
wherein the behavior is stopped in the application program before being executed in the computer.

* * * * *